United States Patent
Bronicki

(10) Patent No.: US 9,115,604 B2
(45) Date of Patent: *Aug. 25, 2015

(54) POWER SYSTEM

(75) Inventor: Lucien Y. Bronicki, Yavne (IL)

(73) Assignee: ORMAT TECHNOLOGIES INC., Reno, NV (US)

( * ) Notice: Subject to any disclaimer, the term of this patent is extended or adjusted under 35 U.S.C. 154(b) by 630 days.

This patent is subject to a terminal disclaimer.

(21) Appl. No.: 13/474,375

(22) Filed: May 17, 2012

(65) Prior Publication Data

US 2012/0286524 A1   Nov. 15, 2012

Related U.S. Application Data

(63) Continuation-in-part of application No. 12/624,063, filed on Nov. 23, 2009, now Pat. No. 8,193,659, which is a continuation-in-part of application No. 12/621,899, filed on Nov. 19, 2009, now abandoned.

(51) Int. Cl.
| | |
|---|---|
| *F01K 25/10* | (2006.01) |
| *F01K 13/02* | (2006.01) |
| *H02P 9/04* | (2006.01) |
| *H02P 9/10* | (2006.01) |
| *H02J 1/10* | (2006.01) |

(52) U.S. Cl.
CPC ........... *F01K 25/10* (2013.01); *F01K 13/02* (2013.01); *H02P 9/04* (2013.01); *H02P 9/102* (2013.01)

(58) Field of Classification Search
USPC ............................................. 307/44
See application file for complete search history.

(56) References Cited

U.S. PATENT DOCUMENTS

| | | | |
|---|---|---|---|
| 6,316,920 | B1 | 11/2001 | Huggett et al. |
| 8,193,659 | B2 * | 6/2012 | Bronicki et al. ............... 307/44 |
| 2005/0206167 | A1 | 9/2005 | Gehret, Jr. |

OTHER PUBLICATIONS

Extended European Search Report dated Aug. 20, 2014 in European Patent Application No. 10831217.4.

Sanyal, S.K. and Enedy, S.L., "Fifty Years of Power Generation at the Geysers Geothermal Field, California-The Lessons Learned", $36^{th}$ Workshop on Geothermal Reservoir Engineering, Stanford University, Stanford CA., Jan. 31-Feb. 2, 2011. pp 1-9.

* cited by examiner

*Primary Examiner* — Robert Deberadinis
(74) *Attorney, Agent, or Firm* — Oblon, McClelland, Maier & Neustadt, L.L.P.

(57) ABSTRACT

A power system includes a Rankine cycle local generator having a capacity greater than a maximum anticipated power level. One or more control devices are operatively connected to the local generator for regulating active and reactive power generated by the generator. Detectors are provided to sense active and reactive voltages. The controller directs the control devices to regulate the generator such that the active power and reactive power are sufficient to satisfy the active and reactive load conditions.

23 Claims, 4 Drawing Sheets

POWER SYSTEM

The present invention relates to the field of power systems. More particularly, the invention relates to a power system for providing a supplemental reserve of power to a factory (industrial or commercial) or from a geothermal power plant complex.

Many regulations require a manager to specify the power requirements of a factory. If the transient power requirements of the factory are greater than the specified requirements, the factory will be prevented to operate at a peak load and the operation of some of the machines of the factory will have to be terminated.

The present invention relates to methods for ensuring the uninterrupted operation of a factory equipped with one or more motorized rotating machines by providing a "spinning reserve", i.e. a supplementary amount of power for use during a variable load, e.g. a peak load, by increasing the power output of one or more generators that are already connected to the electricity lines of the factory. The spinning reserve therefore provides extra generating capacity in addition to the normally sufficient amount of power that the factory receives from an electrical network for use with respect to a base load.

The base and peak loads of a factory are primarily inductive loads, and these loads require the supply of active power for powering the machinery and reactive power for sustaining the electromagnetic field associated with the machinery. The levels of active and reactive power vary during the course of the day, and reactive power is needed to be supplied to a machine even if it idle.

Efficient consumption of power in a factory therefore requires the control of both active and reactive power flow with respect to alternating current (AC) loads. Reactive power flow has been controlled in prior art systems by switching inductors or capacitor banks, in order to partially balance the reactive power of the load.

It would be desirable to provide a simpler reactive power control system that obviates the need for inductor or capacitor switching devices.

The present invention provides a factory with a custom level of reactive power supplied by a spinning reserve.

In addition, the present invention provides a power storage control system for adjusting a level of reactive power that is not based on inductor or capacitor switching devices.

Other advantages of the invention will become apparent as the description proceeds.

The present invention provides a power system for delivering a custom level of electrical power to an industrial or commercial facility, comprising a local generator connected to a turbine operating in accordance with an organic or steam Rankine cycle, said local generator having a capacity at least greater than a maximum anticipated power level needed for the electrical needs of a local industrial or commercial facility, one or more control devices operatively connected to said local generator for regulating active and reactive power generated by said generator, a detector for sensing active voltage induced by said generator, a detector for sensing reactive voltage produced by said generator, and a controller in electrical communication with said one or more control devices and with said active and reactive voltage detectors, wherein said controller directs said one or more control devices to regulate said generator such that the active power and reactive power generated by said generator are sufficient to satisfy active and reactive load conditions, respectively, of said local industrial or commercial facility.

It is to be noted that this aspect of the present invention is also applicable to power produced by geothermal power plants.

The present invention is also directed to a power system for providing a fast acting spinning reserve, comprising a turbine module of an organic or steam Rankine cycle that is coupled to a generator, a main conduit through which motive fluid heated in said thermodynamic cycle is delivered to said turbine module, and a flow control component operatively connected to said main conduit for automatically limiting the flow of the motive fluid to said turbine module during base load conditions and for automatically increasing the flow of the motive fluid to said turbine module during variable load conditions In prior art, geothermal plants have been used substantially only for base loads since flow in a geothermal production well is usually fairly constant. As the power system of the present invention provides the spinning reserve needed for transient periods of variable load by means of the flow control component, e.g. a fast acting bypass valve that diverts motive fluid to a condenser or to a heat exchanger for producing industrial heat, a lower output of the power system can be maintained without affecting the flow and operation of the geothermal production well.

In the present invention, power devices associated with a local generator that usually has a capacity equal to or greater than the anticipated variable load, e.g. a peak load, of an industrial or commercial facility are employed to supply a custom level of active and reactive power. To improve the economic viability of the power system, electricity is generated during periods of variable loads by means of gases or vapors produced in a thermodynamic cycle based on e.g. waste, geothermal, or stored heat. In addition, the spinning reserve derived from the thermodynamic cycle can be available to the control system in a short duration of time. Usually, the thermodynamic cycle includes a turbine driving the local generator operating in accordance with e.g. an organic Rankine cycle or e.g. a steam Rankine cycle. The organic motive fluid can comprise propane, butane, e.g. n-butane or isobutane, pentane e.g. n-pentane or isopentane, or hexane, e.g. n-hexane or isohexane, iso-nonane, iso-dodecane, etc., and cyclo—version of the above-mentioned non-limiting examples of organic motive fluids previously mentioned.

Figure 1:
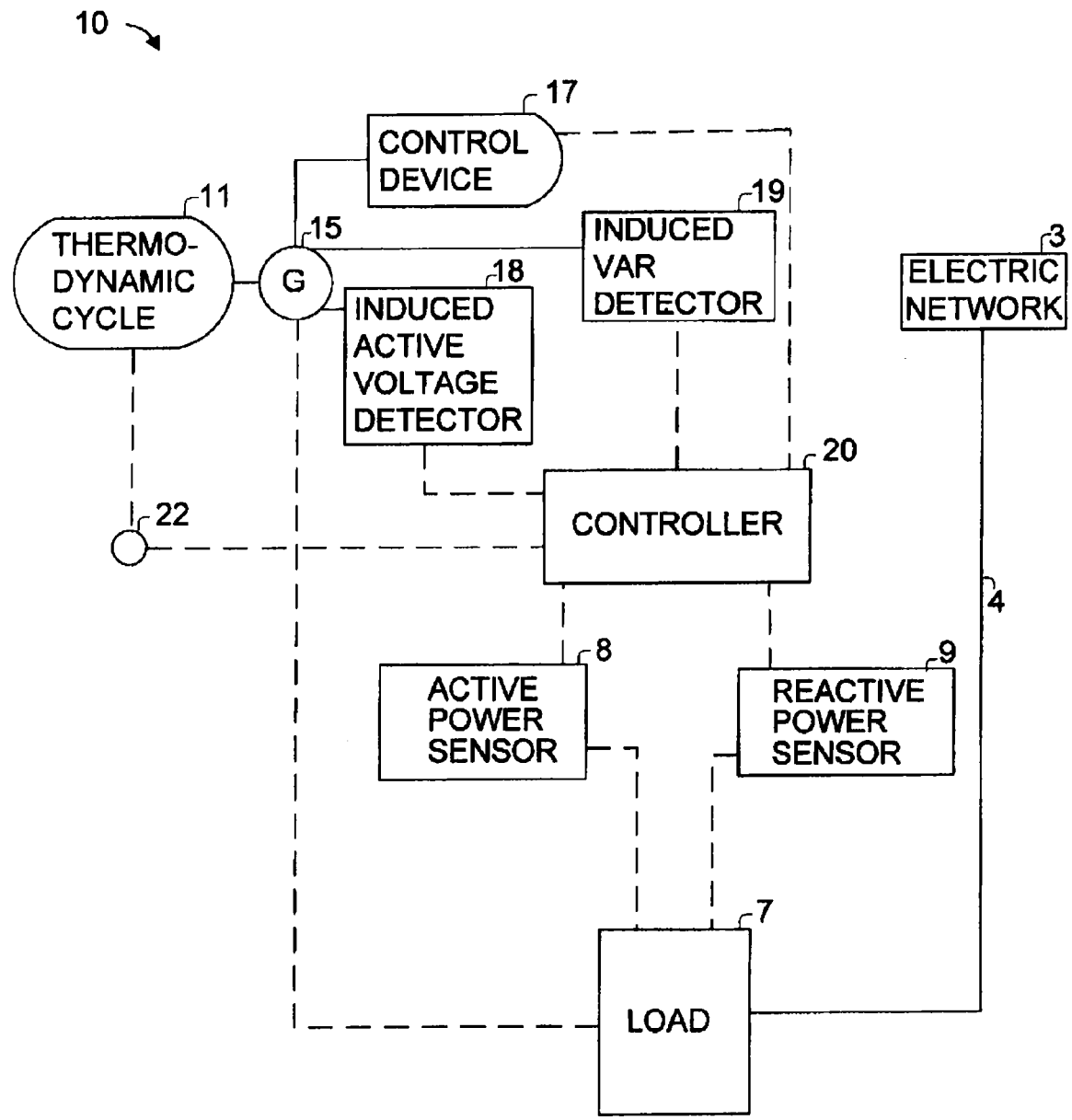
FIG. 1 is a block diagram of a system for controlling a custom level of electrical power supplied to an industrial or commercial facility, according to one embodiment of the present invention.

FIG. 1 is a block diagram of a power system generally designated by numeral 10, according to one embodiment of the present invention. Load 7 represents the instantaneous accumulative electrical load imposed by the industrial or commercial facility at a gate region, as detected by active power sensor 8 and reactive power sensor 9, e.g. a frequency sensor or a power meter. The electrical requirements of load 7 are partially supplied by electric network or grid 3 via line 4 and partially by local generator 15, which is usually a synchronous generator that supplies electricity in parallel to electrical network 3 via line 16. Local generator 15 is coupled to a turbine of thermodynamic cycle 11, which can be a Brayton, Kalina or Rankine cycle. The Rankine cycle operating generator 15 can be operated in accordance with a closed organic Rankine cycle using an organic motive fluid, or a closed steam Rankine cycle using water as its motive fluid, which receives heat from e.g. waste heat from e.g. the factory (industrial or commercial facility) or from geothermal heat. It will be appreciated, however, that control system 10 is also operational when generator 15 produces electricity by any other means known to those skilled in the art. While the power level supplied by electric network 3 is substantially constant, corresponding to the power requirements specified by a factory manager, the power supplied by generator 15 is variable. That is, generator 15 supplies a first power level during base load conditions and a second power level during variable load conditions.

The AC electrical power supplied by electric network or grid 3 and by local generator 15 has two components: an active power component and a reactive power component. The vector sum of these two components is expressed by the following equation:

$$S=P+jQ, \quad \text{(Equation 1)}$$

where S is apparent power, P is active power, Q is reactive power, and j is an imaginary unit. When the supplied electric power is in the form of a sinusoidal waveform, P, Q and S can be expressed as vectors such that:

$$S^2=P^2+Q^2 \quad \text{(Equation 2)}$$

The power factor, which is the ratio of active power to apparent power, is indicative of the percentage of reactive loads within load 7 and the corresponding current for the same amount of apparent power that is transferred. The power factor is generally defined as cos θ, where θ is the phase angle between the current and voltage. Thus, active power can be expressed by the following equation:

$$P=S^*\cos\theta \quad \text{(Equation 3)}$$

Usually, the apparent power level is greater during variable load conditions than during base load conditions. However, the power level could be less during variable load conditions than during base load conditions. It will also be appreciated that the reactive power level could increase or decrease when the apparent power level increases from a first load condition to a second load condition, and likewise the reactive power level could increase or decrease when the apparent power level decreases from a second load condition to a first load condition. For example, the active power level could be higher than the reactive power level during normal working hours of a factory when the machines of e.g. an assembly line are operational, while the reactive power level could be higher than the active power level after the normal working hours since the machines are deactivated and some of the technical staff may stay until later or other times and operate air conditioners that require a relatively high level of reactive power.

Local generator 15 is adapted to supply each of the required active and reactive power levels for supplementing the respective power levels supplied by electric network 3, both during base load conditions and variable load conditions if need be. The capacity of generator 15 is selected such that it corresponds to the demands of an anticipated peak load. In order to regulate the power levels, generator 15 is provided with one or more control devices 17, and with detectors 18 and 19 for detecting the active and reactive power (VAR), respectively, induced by the local generator. Sensors 8 and 9, control devices 17, and detectors 18, 19 are in electric communication with controller 20, e.g. a PLC controller. After controller 20 receives the detected load values from sensors 8 and 9, the controller directs each of the control devices 17 to govern generator 15 in such a way that the required active power level is supplied to load 7 as detected by sensor 8 and that the induced voltage level as sensed by detector 19 will be sufficient to supply the required level of reactive power to the load 7 as detected by sensor 9.

Alternatively, the load levels may be manually input to controller 20 in response to a reading of sensors 8 and 9, whereupon controller 20 directs control devices 17 to govern generator 15 in such a way that the induced active voltage level as sensed by detector 18 will be sufficient to supply the required level of active power to load 7 as detected by sensor 8 and that the induced reactive voltage level as sensed by detector 19 will be sufficient to supply the required level of reactive power to the load 7 as detected by sensor 9.

The magnetic field of generator 15 may be provided by permanent magnets mounted on a rotor assembly. The rotor assembly may also comprise a brushless exciter armature and rectifiers. The permanent magnet generator may supply power to control device 17.

The electromotive force developed by a synchronous generator can be expressed by the following equation:

$$E=K^*\Phi^*N, \quad \text{(Equation 4)}$$

where E is the active voltage normally referred to as the electromotive force, K is a machine coefficient, Φ is the electromagnetic flux, and N is the rotational speed of the generator rotor.

The voltage level that is induced by a generator is dependent on the change of magnetic flux with time. The induced active (V) and reactive voltage (VAR) levels can therefore be regulated by means of a control device 17 in several different ways.

1) Voltage Adjustment—The relation between V and VAR is such that VAR increases as V decreases. Consequently, a desired level of V or VAR may be obtained by adjustment of the active voltage exitation, such as by means of an automatic voltage regulator (AVR).
2) Reactive Voltage Ampere Control—The apparent power is generated such that VAR is maintained at a set level, as regulated by a VAR controller.
3) Power Factor Control—The generated voltage level is such that it enables a desired power factor to be maintained.
4) Speed Control—The rotational speed of the generator rotor is controlled in such a way so that the frequency (f) of the V voltage waveform remains constant.
5) Frequency Adjustment—The relation between active power frequency f and active power level P is a linear function such that P increases as f decreases. Consequently, a desired level of P may be obtained by adjusting the active power frequency.

Controller 20 is also in electrical communication, e.g. data communication, with flow control component 22 of thermodynamic cycle 11, in order to permit local generator 15 to supply a custom level of active and reactive power both during base load conditions and variable load conditions. Following indication by sensors 8 and 9 that the load conditions of the factory have changed from a base load to a variable or from a variable load to a base load, as determined by predetermined rules stored in controller 20, the controller directs component 22 to change its mode of operation so that generator 15 will generate a sufficient amount of electricity needed for the given load conditions.

Figure 2:
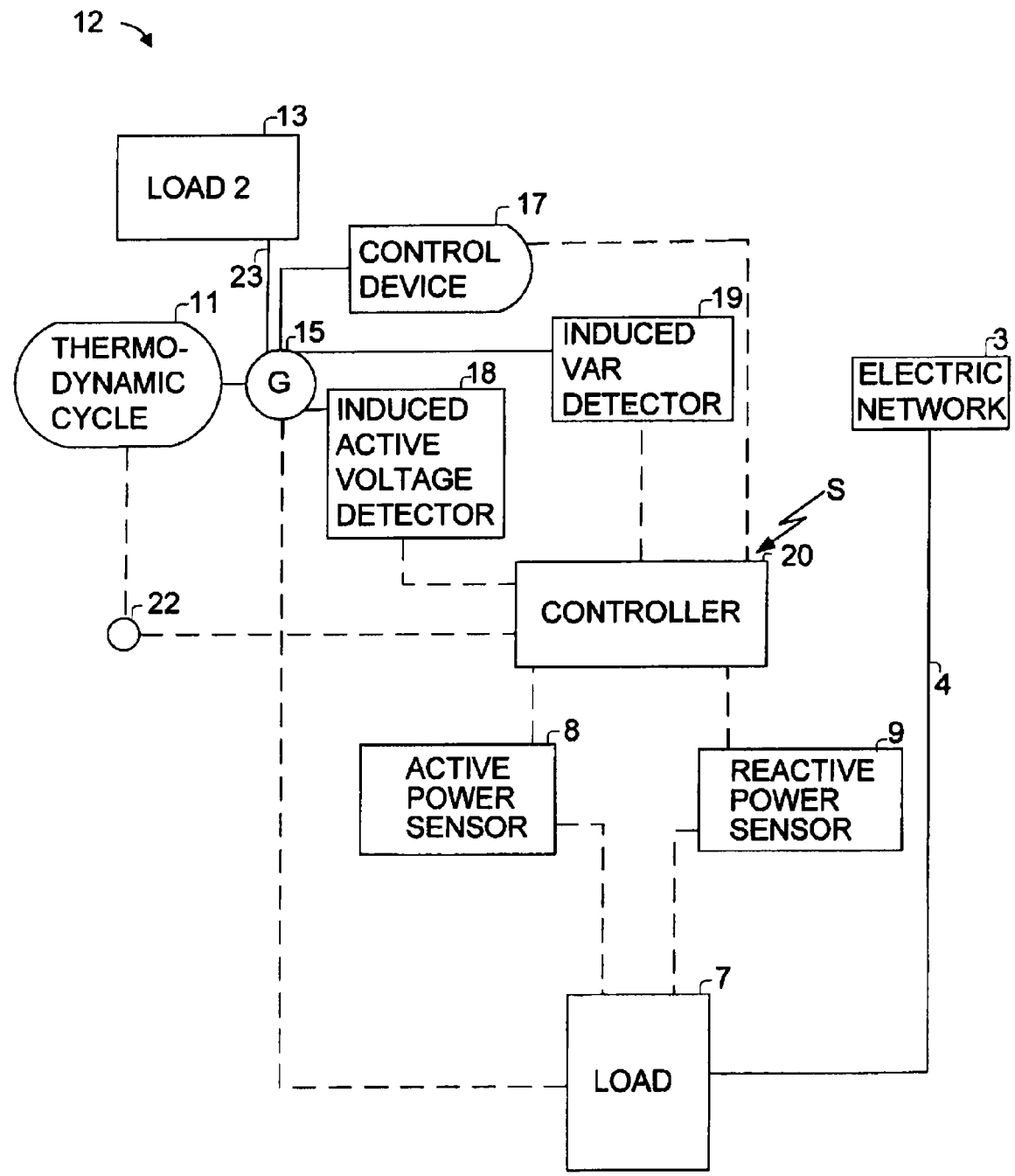
FIG. 2 is a block diagram of a system for controlling a custom level of electrical power supplied to each of two industrial or commercial facilities.

FIG. 2 illustrates another embodiment of the invention wherein power system 12 supplies a custom level of active and reactive power to each of two or more loads in an industrial or commercial facility, factory or factories. Under normal conditions, generator 15 supplies a custom level of active and reactive power via line 16, as described hereinabove with respect to FIG. 1, to the electric grid represented by load 7 of the first factory in the vicinity of which generator 15 is located. When a controller of a second factory determines that the second factory requires a greater level of active or reactive power than what is being supplied thereto, e.g. by electric network 3, a signal S is transmitted to controller 20 of the first factory to request a supplemental amount of power. Signal S may be transmitted by any known means, such as wirelessly or via a data network, and generally includes the level of the requested supplemental active or reactive power. Controller 20 then directs flow control component 22 of thermodynamic cycle 11 to change its mode of operation so that generator 15 will generate a sufficient amount of electricity needed for the load conditions of both the first and second factories. Local generator 15 is typically coupled to a turbine of thermodynamic cycle 11, which can be characterized by a Brayton, Kalina or Rankine cycle. The Rankine cycle operating generator 15 can be operated in accordance with a closed organic Rankine cycle using an organic motive fluid, or a steam Rankine cycle using water as its motive fluid, which receives heat from e.g. waste heat from e.g. the factory (industrial or commercial facility) or from geothermal heat. The organic motive fluid can comprise propane, butane, e.g. n-butane or isobutane, pentane e.g. n-pentane or isopentane, or hexane, e.g. n-hexane or isohexane, iso-nonane, iso-dodecane, etc., and cyclo—version of the above-mentioned non-limiting examples of organic motive fluids previously mentioned. It will be appreciated, however, that control system 10 is also operational when generator 15 produces electricity by any other means known to those skilled in the art. Thus, generator 15 will deliver a custom level of supplemental active and reactive power to load 7 of the first factory via line 16 and a custom level of supplemental active and reactive power to the electric grid represented by load 13 of the second factory via line 23.

Figure 3:
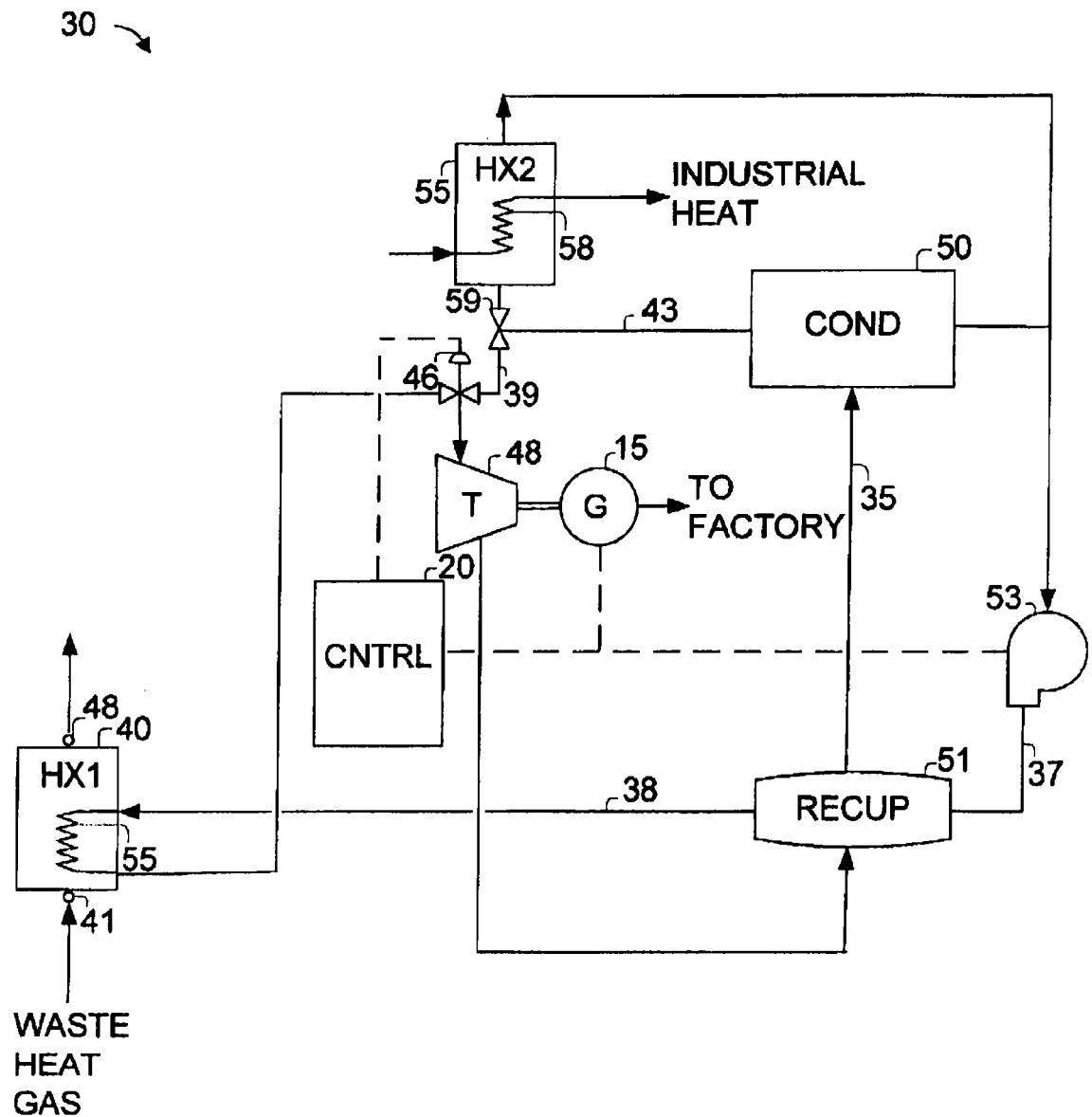
FIG. 3 is a block diagram of an exemplary power system for providing supplemental power to an industrial or commercial facility, according to one embodiment of the invention.

FIG. 3 illustrates an exemplary power system 30 for providing a fast acting spinning reserve. Power system 30 is usually a closed organic Rankine cycle (ORC) power system using an organic motive fluid or a closed steam Rankine cycle power system. The organic motive fluid can comprise propane, butane, e.g. n-butane or isobutane, pentane e.g. n-pentane or isopentane, or hexane, e.g. n-hexane or isohexane, iso-nonane, iso-dodecane, etc., and cyclo—version of the above-mentioned non-limiting examples of organic motive fluids previously mentioned. It will also be appreciated that the spinning reserve can be provided by means of a power system based on a Brayton or Kalina thermodynamic cycle.

When an organic Rankine cycle power system is used, the organic motive fluid of the organic Rankine cycle is brought in heat exchanger relation with waste heat gases, such as the exhaust gases of a gas turbine, a diesel engine, a furnace or heat from geothermal heat. The waste heat gases are introduced into inlet 41 of heat exchanger 40 and discharged from outlet 48 thereafter, and the motive fluid flowing through heating coils 45 positioned within heat exchanger 40 is heated by the waste heat gases, which flow over the heating coils.

Heated motive fluid vapor produced by heating coils 45 is supplied via conduit 32 to organic turbine module 48, which may comprise more than one pressure stage and expands therein. Turbine module 48 is coupled to local generator 15. Expanded motive fluid vapor, after power has been produced by turbine module 48, flows via conduit 34 to recuperator 51. The motive fluid exits recuperator 51 and is delivered via conduit 35 to condenser 50, which may be air or water cooled. Cycle pump 53 supplies the condensate via conduit 37 from condenser 50 to recuperator 51, which heats the condensate, and the heated motive fluid condensate is then supplied to heat exchanger 40 through conduit 38. It will be appreciated that other power plant components may be employed as well, according to the requirements of the factory.

Bypass valve 46 is a control valve and is connected to conduit 32. When the factory imposes base load conditions, controller 20 directs bypass valve 46 to open so that portion of the heated motive fluid is diverted via conduit 39 to a second heat exchanger 55. Thus, local generator 15 will generate a lower amount of electricity than during variable load conditions. Nevertheless, controller 20 regulates the active and reactive power levels induced by generator 15 during base load conditions to correspond to the needs of the factory. Diverted motive fluid heats a fluid in heat exchanger 55 for providing industrial heat by means of coils 58. Heat depleted motive fluid exiting second heat exchanger 55 can be supplied to back to the power cycle through conduit If the factory does not require industrial heat, valve 59 is closed and the diverted motive fluid will be directed to condenser 50 via conduit 43.

When the local factory, or alternatively a remote factory, imposes variable load conditions such as peak load conditions, controller 20 directs bypass valve 46 to close so that the entire amount of heated motive fluid vapor flowing in conduit 32, or alternatively a large majority thereof, will be introduced to turbine module 48. Controller 20 also regulates during variable load conditions the active and reactive power levels induced by generator 15 to supply the load requirements of the factory.

Figure 4:
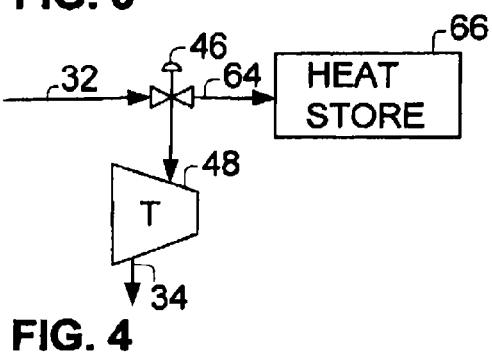
FIG. 4 is a block diagram of a portion of a power system for providing a supplemental power to an industrial or commercial facility, according to another embodiment of the invention.

Alternatively, as shown in FIG. 4, a portion of the heated motive fluid vapor will be diverted by means of bypass valve 46 to a heat store 66 via conduit 64. Heat store 66 may be in the form of a body of water that is heated by the heated motive fluid flowing in conduit 32 or other heat storage means. After thermal energy is accumulated in heat store 66, it can be transferred to industrial heat processes.

In another embodiment of the invention, a fast acting spinning reserve is provided without use of a flow control component. In this embodiment, the turbine module is constantly operating at full efficiency and the local generator generates a power level sufficient for peak load conditions, such as when industrial heat is not required. When the control system determines that the factory is imposing base load conditions or variable load conditions having a magnitude of active or reactive power less than that which is generated by the local generator, the surplus power is supplied to the electric network. Alternatively, the generator control components regulate the power output to correspond to the instantaneous load conditions.

Figure 5:
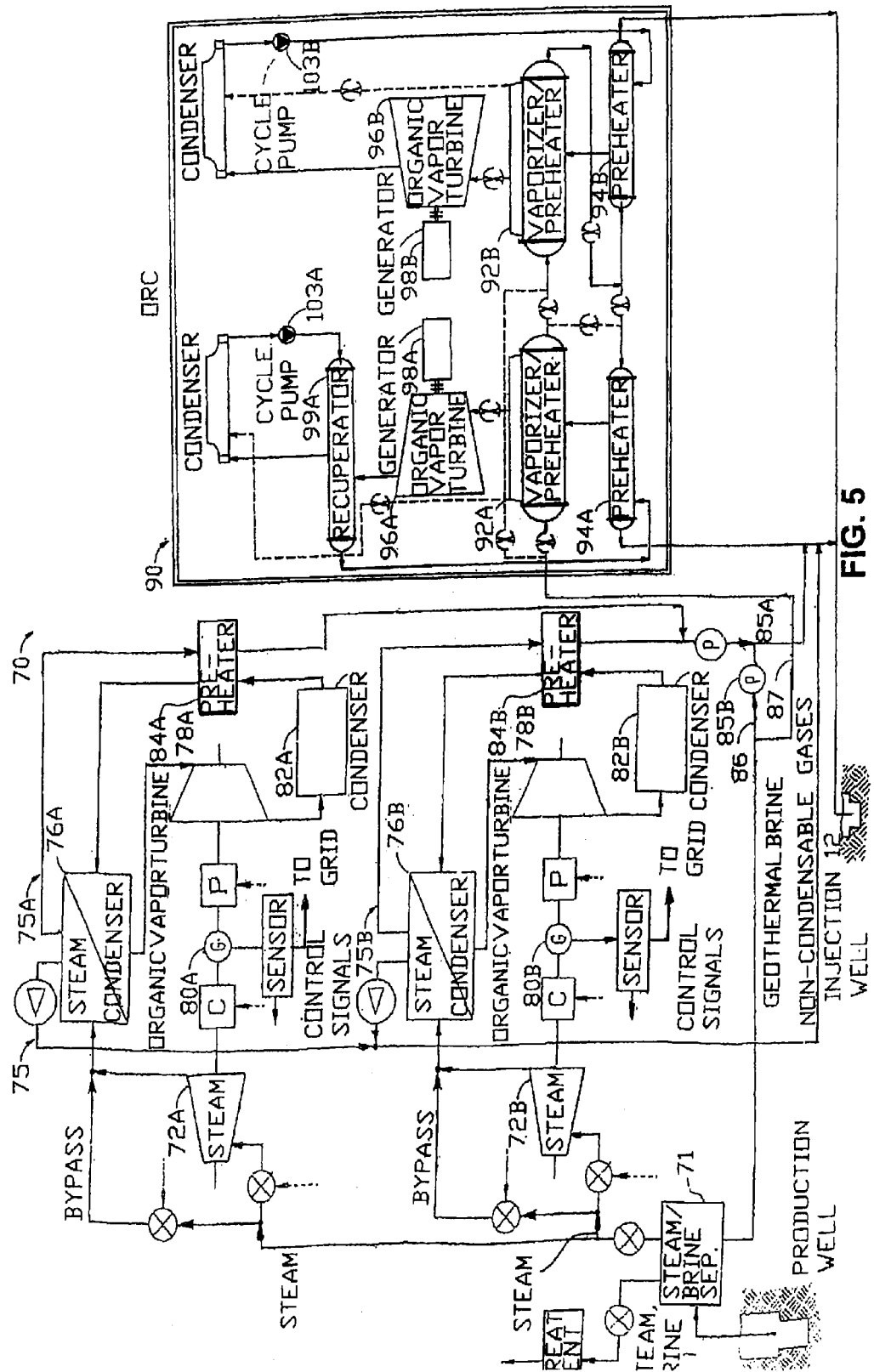
FIG. 5 is block diagram of a further embodiment of the present invention.

In a further embodiment, particularly relevant to utilization of geothermal heat, designated 70 and described with reference to FIG. 5, an organic Rankine cycle (ORC) power plant can be operated on brine separated from the geothermal fluid wherein steam condensate supplied from pre-heaters of combined cycle steam-organic Rankine cycle power plant modules of combined cycle steam-organic Rankine cycle power plant 75 operating on separated geothermal steam is added, using a pump, to the brine supplied to organic Rankine cycle (ORC) power plant 90. In power plant 70, separated steam operates steam turbines 72A and 72B in combined cycle steam-organic Rankine cycle power plant modules 75A and 75B which produce power, the expanded, low pressure steam being supplied to steam condensers/organic motive fluid vaporizers 76A and 76B cooled by pre-heated organic motive fluid and steam condensate and vaporized motive fluid being produced. The vaporized organic motive fluid produced is supplied to organic vapor turbines 78A and 78B which produce power via electric generators 80A and 80B present in combined cycle steam-organic Rankine cycle power plant modules 75A and 75B and the expanded organic motive fluid vapor is supplied from organic vapor turbines 78A and 78B to condensers 82A and 82B, which can be air-cooled or water cooled, where organic motive fluid condensate is produced. Usually condensers 82A and 82B are air-cooled, however can be water cooled. The organic motive fluid condensate produced is then supplied to pre-heaters 84A and 84B where steam condensate supplied from steam condensers 76A and 76B pre-heats the organic motive fluid condensate and the pre-heated organic motive fluid condensate is then supplied to steam condensers/organic motive fluid vaporizers 76A and 76B for cooling the expanded low pressure steam exiting steam turbines 72A and 72B thus completing the cycle. The organic motive fluid can comprise butane, e.g. n-butane or isobutane, pentane e.g. n-pentane or isopentane, or hexane, e.g. n-hexane or isohexane, etc.

In the present embodiment, portion of heat depleted steam condensate exiting pre-heaters 84A and 84B in line 86 is combined, using pumps 85A and 85B, with separated geothermal liquid or brine supplied from steam/geothermal liquid or brine separator 71. The combined steam condensate—separated geothermal liquid or brine in line 87 is supplied to organic Rankine cycle power plant 90. In organic Rankine cycle power plant 90, although a single level organic Rankine cycle power plant can be used, a two level organic Rankine cycle power plant is avantageously used and combined steam condensate—separated geothermal liquid or brine in line 87 is supplied to organic motive fluid vaporizers 92A and 92B in series where organic motive vapor is produced. Thereafter, heat depleted combined steam condensate—separated geothermal liquid or brine is supplied in parallel to organic motive fluid pre-heaters 94A and 94B, the further heat-depleted combined steam condensate—separated geothermal liquid or brine exiting the pre-heater being supplied together with other steam condensate and non-condensable gases from steam condensers/organic motive fluid vaporizers 76A and 76B to injection well 12. In power plant 90, organic motive vapor produced in organic motive fluid vaporizers 92A and 92B is supplied to organic vapor turbines 96A and 96B respectively and power is produced by driving generators 98A and 96B usually. Expanded organic motive fluid vapor exiting organic vapor turbine 96A is supplied via recuperator 99A to organic motive fluid condenser 101A which can be air-cooled or water cooled, and the organic motive fluid condensate produced therein is supplied to the recuperator using cycle 103A where it is heated by the expanded organic motive fluid vapor. Expanded organic motive fluid vapor exiting organic vapor turbine 96B is supplied to organic motive fluid condenser 101B, which can be air-cooled or water cooled, and the organic motive fluid condensate produced therein is supplied to pre-heater 94B using cycle pump. The organic motive fluid in power plant 90 can comprise butane, e.g. n-butane or isobutane, pentane e.g. n-pentane or isopentane, or hexane, e.g. n-hexane or isohexane, etc.

In power plant 90, if need be or for a certain reason, one of organic vapor turbines 96A and 96B can not be operated or idled and be put back into operation when needed or is suitable. In such a manner, this power plant can be considered as having reserve or additional power available. In such cases appropriate bypass lines and valves can be used, examples of which are shown in FIG. 5 (see "dashed—dotted" lines and valves).

Furthermore, by using steam condensate in line 86 to increase the flow of the geothermal brine or liquid supplied in line 87 to the organic Rankine cycle power plant 90, possible flashing of this geothermal liquid or brine is avoided. Consequently, the use of a brine supply pump is avoided. By avoiding the need to use such a brine supply pump, the need to operate the pump under high temperature conditions (e.g. about 400° F.) is avoided.

Here, the organic motive fluid can comprise propane, butane, e.g. n-butane or isobutane, pentane e.g. n-pentane or isopentane, or hexane, e.g. n-hexane or isohexane, isononane, iso-dodecane, etc., and cyclo—version of the above-mentioned non-limiting examples of organic motive fluids previously mentioned.

In addition, with reference to the embodiment described with reference to FIG. 5, it could be advantageous to use a steam cycle power system.

The power produced in accordance with this embodiment and in other embodiments where geothermal energy is used can be supplied to the power grid located often in an isolated geographic area, e.g. an island, this power being optionally used to charge batteries for use in a plug-in hybrid vehicle or in a battery operated electric vehicle.

Note that, in particular, cyclo—versions of the non-limiting examples of organic motive fluids mentioned above can be especially advantageous when a specific power plant is operating in an environment where relatively high ambient temperatures prevail so as to enable the facilitation of the power plant condenser operation permitting relatively high condensing temperatures to be used, if advantageous, so that little if any vacuum levels be present in the power plant condenser.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A power system for delivering a custom level of electrical power to an industrial or commercial facility, comprising a local generator connected to a turbine operating in accordance with an organic Rankine or steam Rankine cycle, said local generator having a capacity at least greater than a maximum anticipated power level needed for the electrical needs of a local industrial or commercial facility, one or more control devices operatively connected to said local generator for regulating active and reactive power generated by said generator, a detector for sensing active voltage produced by said generator, a detector for sensing reactive voltage produced by said generator, and a controller in electrical communication with said one or more control devices and with said active and reactive voltage detectors, wherein said controller directs said one or more control devices to regulate said generator such that the active power and reactive power generated by said generator are sufficient to satisfy active and reactive load conditions, respectively, of said local industrial or commercial facility.

2. The power system according to claim 1, wherein the active power and reactive power generated by the local generator sufficiently supplement the active power and reactive power, respectively, supplied by an electric network to satisfy the load conditions of the local industrial or commercial facility.

3. The power system according to claim 1, wherein the controller is further in communication with an active power sensor and with a reactive power sensor for detecting an instantaneous accumulative electrical load imposed by the local industrial or commercial facility at a gate region, the controller directing one or more control devices in response to sensed values received from said active and reactive power sensors to regulate said generator such that the active power and reactive power generated by the generator are sufficient to satisfy active and reactive load conditions, respectively, of the local industrial or commercial facility.

4. The power system according to claim 1 wherein said organic Rankine cycle utilizes an organic motive fluid selected from the group propane, butane, pentane, or hexane as its motive fluid.

5. The power system according to claim 4, wherein the controller is further in communication with a flow controlling component of the thermodynamic cycle, said flow control component adapted to limit the flow of motive fluid to the turbine during base load conditions.

6. The power system according to claim 1, wherein the one or more control devices are selected from the group of voltage controller, reactive voltage ampere controller, power factor controller, rotor speed controller, and frequency controller, or a combination thereof.

7. The power system according to claim 1, wherein a surplus amount of active power and reactive power generated by the generator and not needed by the industrial or commercial facility is supplied to an electric network or grid.

8. The power system according to claim 1, wherein a surplus amount of active power and reactive power generated by the generator and not needed by the local industrial or commercial facility is supplied to a remote industrial or commercial facility.

9. The power system according to claim 8, wherein the controller is in data communication with a controller of the remote industrial or commercial facility, the surplus amount of active power and reactive power being supplied to the remote industrial or commercial facility following transmission of a request signal from the controller of the remote industrial or commercial facility to the controller of the local industrial or commercial facility.

10. A power grid incorporating the power system of claim 1.

11. The power grid of claim 10 having a plug-in hybrid electric vehicle or battery operated electric vehicle electrically connected thereto, to charge the vehicle.

12. A power system for providing a fast acting spinning reserve, comprising a turbine module operating in accordance with an organic Rankine cycle or steam power cycle coupled to a generator, a main conduit through which motive fluid vapor heated in said organic Rankine cycle or steam power cycle is supplied to said turbine module, and a flow control component operatively connected to said main conduit for automatically limiting the flow of the motive fluid vapor to said turbine module during base load conditions and for automatically increasing the flow of the motive fluid vapor to said turbine module during variable load conditions.

13. The power system according to claim 12, wherein the motive fluid is heated by means of a main heat exchanger through which high temperature fluid flows.

14. The power system according to claim 13, wherein the high temperature fluid is selected from the group of waste heat gases, geothermal fluid and heat storage fluid.

15. The power system according to claim 12 wherein said organic Rankine cycle utilizes an organic motive fluid selected from the group propane, butane, pentane, or hexane as its motive fluid.

16. The power system according to claim 12, wherein the flow control component is a bypass valve for diverting a portion of the heated motive fluid to a second conduit.

17. The power system according to claim 16, wherein the diverted motive fluid flows via the second conduit to a secondary heat exchanger wherein fluid used in industrial process heat is heated.

18. The power system according to claim 16, wherein the diverted motive fluid flows via the second conduit to a condenser of the organic Rankine cycle.

19. The power system according to claim 16, including a heat store.

20. The power system according to claim 12, further comprising a controller in communication with the flow control component and with a control component of the generator, said controller adapted to regulate the generator such that active power and reactive power generated by the generator are sufficient to satisfy active and reactive load conditions, respectively, of an industrial or commercial facility.

21. The power system according to, claim 12 further comprising:
  a further generator for supplying power to satisfy the load,
  a further turbine module operating in accordance with an organic Rankine cycle or steam power cycle coupled to the generator,
  a further main conduit through which motive fluid vapor heated in said organic Rankine cycle or steam power cycle is supplied to said turbine module, and a further flow control component operatively connected to said main conduit, and
  a flow control component controller responsive to load conditions, for automatically limiting the flow of the motive fluid vapor to said further turbine module during base load conditions and for automatically increasing the flow of the motive fluid vapor to said further turbine module during variable load conditions.

22. The power system according to claim 12 wherein said power system is connected to a power grid.

23. The power system according to claim 22 wherein said power grid has a plug-in hybrid electric vehicle or battery operated electric vehicle electrically connected thereto, to charge the vehicle.

* * * * *